3,411,213
AMALGAM CONVEYOR
Ronald P. Spinello, Westbury, N.Y., assignor to The Dentists' Supply Company of New York, York, Pa., a corporation of New York
Continuation-in-part of application Ser. No. 437,806, Mar. 8, 1965. This application Feb. 14, 1966, Ser. No. 532,512
10 Claims. (Cl. 32—60)

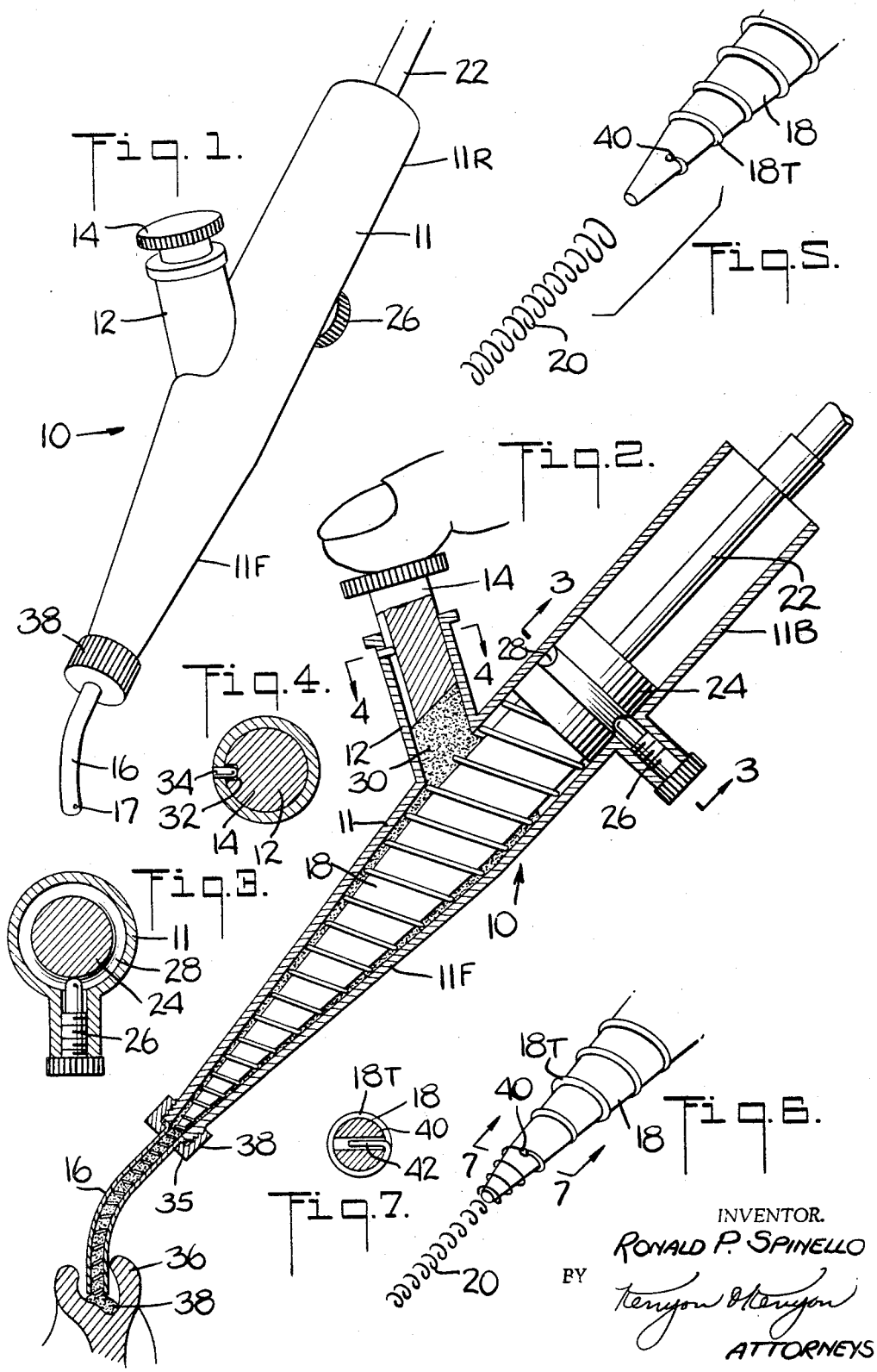

ABSTRACT OF THE DISCLOSURE

An amalgam condenser and carrier operable to receive the ingredients to form dental amalgam and comprising a housing in which at least the interior decreases progressively in diameter from adjacent an inlet opening to a discharge opening adjacent the opposite end thereof, a screw conveyor complementary to and rotatable within the interior of said housing, said conveyor having threads thereon of a uniform pitch and depth to define a groove comprising a spiral passage for amalgam which is of uniform depth and decreasing uniformly in diameter to the discharge opening of the housing whereby, upon rotation of the screw in a feeding direction, amalgam simultaneously is fed to the discharge opening and is condensed without sharp changes in magnitude and direction to insure uninterrupted feeding movement of the amalgam through said housing from said inlet to said discharge openings, thereby obviating any appreciable condensing of amalgam after being discharged into a prepared dental cavity.

---

This application is a continuation-in-part of application Ser. No. 437,806, filed Mar. 8, 1965 and now abandoned.

This invention relates in general to a dental tool and more particularly to a conveyor for carrying amalgam from a reservoir directly to a tooth to provide a desired filling. The design of this amalgam conveyor is such that a degree of condensation is provided by the conveyor without causing the amalgam to harden (set) prior to its being deposited in a tooth cavity.

In filling cavities in teeth, dentists have had to use in general two separate tools; an amalgam carrier to pick up the amalgam, carry it to the tooth and deposit it in the cavity, and an amalgam condenser to condense or compact the plastic mass of amalgam in the cavity. The dentist, or his assistant, mixes a quantity of amalgam, (primarily mercury and silver) usually of a sufficient amount to accomplish one complete filling. The dentist picks up a small quantity of amalgam in the amalgam carrier, carries it to the cavity and deposits it therein. The dentist next picks up an amalgam condenser in order to condense the plastic mass of amalgam in the cavity. The dentist then picks up another small quantity of amalgam in the amalgam carrier, carries it to the tooth and deposits it in like manner followed by another condensing operation. The filling of a tooth cavity may require many such trips for each instrument, a time consuming procedure.

Since the amalgam solidifies to a preliminary set state in a relatively short time, considerable speed is necessary for the filling operation. The prepared quantity of amalgam must be repeatedly manipulated or mulled to prevent this preliminary set. Furthermore, the dental instruments must be repeatedly set aside thereby running the risk of picking up foreign matter or bacteria.

The aim in the condensation of amalgam is to pack the amalgam crystals (mainly and usually silver) closely together so that the minimum amount of mercury is necessary for cohesion, the excess mercury being pressed out of the mix by the condensing procedure. The known and commonly used techniques of tamping for accomplishing this procedure all involve pushing into the amalgam mass with a suitably sized instrument. This tamping is done with a reciprocating stroke action, either by hand or by means of a mechanical or electronic vibrating device. In these techniques, the action of carrying and the action of condensing are two separate procedures as described above.

It is an object of this invention to provide a new and useful means of condensing dental amalgam.

It has been found by applicant that if amalgam is fed into a cavity under pressure and in a continuous way that the amalgam becomes precondensed and is applied to the cavity in a condensed form. The pressure that is employed to condense the amalgam must be coupled with a thrust pressure that serves to provide a well adapted, in addition to a swell condensed, filling. Thus it has been found that a continuous squeezing pressure on the amalgam as it is carried to the tooth together with a forceful insertion of the amalgam into the tooth provides a filling that will set well. The filling is well adapted in that it fills the cavity completely and provides a tight bond and in addition is condensed at the point at which the amalgam is inserted into the tooth.

Accordingly, it is a further object of this invention to provide an instrument which can continuously condense and feed amalgam under force into a tooth cavity, thereby employing the continuous feed principle which applicant has discovered. The advantage afforded by meeting this object is that one instrument and one procedure is necessary to carry, condense and adapt the amalgam.

It is a further object of this invention to provide a combination amalgam condenser and carrier which, in its design, takes into consideration the very viscous nature of amalgam by avoiding any appreciable discontinuities and sharp changes in direction of feeding or rate of gradual decrease in cross-sectional area while condensation and feeding progresses.

It is a more specific object of this invention to provide a combination dental amalgam carrier and condenser, whereby the position of the instrument need not be changed to condense the amalgam in the cavity after depositing the amalgam therein from the instrument.

Other objects include the ability of the instrument to be rapidly disengaged for cleaning; complete disposability of the entire inner working mechanism; an instrument which provides denser amalgam fillings without the annoying vibrations associated with conventional mechanical condensing instruments; and an instrument which provides fingertip control of the amount and force of amalgam flow.

The objects of this invention are accomplished in one embodiment, by providing a dental tool adapted to be attached to the conventional and commonly used straight dental handpiece of a dental engine, thereby using the dental engine as a source of rotational drive.

Other objects and purposes of this invention will become apparent from a consideration of the following description taken in conjunction with the drawings, in which:

FIG. 1 is a perspective view of an assembled embodiment of a dental tool made according to this invention;

FIG. 2 is a longitudinal cross-sectional view of the FIG. 1 dental tool;

FIG. 3 is a cross-sectional along the plane 3—3 of FIG. 2 showing a means for retaining the screw conveyor in the housing;

FIG. 4 is a cross-sectional view along the plane 4—4 of FIG. 2 showing the relationship between the plunger and housing of the amalgam reservoir;

FIG. 5 is a perspective view of the output end of the screw conveyor employed showing a spring portion separated from the end of the tapered portion;

FIG. 6 is a perspective view similar to FIG. 5 showing the spring portion attached to the end of the tapered portion of the amalgam conveyor; and FIG. 7 is a cross-sectional view taken along the plane 7—7 of FIG. 6 showing the connection between the spring and tapered screw portions of the amalgam conveyor.

The dental tool 10 shown in FIG. 1 has a housing 11 which includes a tapered forward portion 11F and a cylindrical rearward portion 11R as well as a reservoir portion 12. A finger operated plunger 14 is slidably mounted within the reservoir 12 so that the operator can control the feed of amalgam through the tool 10. A hollow curved tube 16 communicates to the forward end of the housing 11 so that amalgam which is conveyed through the housing 11 will be conveyed through the tube 16 to be ultimately applied to fill a cavity of a tooth.

The construction and operation of the dental tool 10 can be best understood from the FIG. 2 longitudinal cross-section. The most significant feature of this dental tool 10 is the amalgam conveyor composed of a tapered screw conveyor 18 with threads 18T having a substantially constant pitch and a helical spring 20 attached to the forward end of the conveyor 18. The screw conveyor 18 is fitted within the housing 11 so that the conveyor 18 is free to rotate about its major axis. The threads 18T of the conveyor 18 are positioned flush against the inner wall of the housing 11 so that they will provide a wiping action on the inner wall and convey all the amalgam in a forward direction as the screw conveyor 18 rotates.

The screw conveyor 18 tapers down toward its discharge end so that there is a smooth and continuous transition from the threads 18T of the screw conveyor 18 to the helical spring 20. In this fashion, the spring 20 forms a continuation of the threads 18T. The spring 20 is fitted within the curved tube 16 so as to provide a wiping action on the inner walls of the tube 16 in much the same fashion as do the threads 18T provide a wiping action on the inner wall of the housing 11. The importance of this wiping action lies in the nature of the amalgam conveyed by this dental tool 10. The housing 11 and tube 16 are normally made of stainless steel to which amalgam tends not to stick. However, if the walls of the stainless steel parts are not continuously wiped free of amalgam, there will be a tendency for amalgam to build up and harden. Once it does, the amalgam that is being conveyed will have a ready tendency to stick to the hardened amalgam and thus provide a build up of hardened amalgam that will cause jamming of the instrument. Furthermore, even if the build up does not become extensive enough to directly engage the threads 18T, the hardened amalgam will ultimately break off in parts so as to provide chips that will jam the conveyor at its forward end.

The reasons why the wiping action between the threads 18T and the inner wall of the housing 11 as well as between the spring 20 and the inner wall of the curved tube 16 are important also dictate another important structural feature of the device of this invention. In general, it is important that there be no sharp discontinuities in the path of the amalgam. In particular, it is important that the effective cross-setcional area through which the amalgam is being forced decrease at a continuous rate that avoids both sharp discontinuities and sharp changes in the rate at which this effective cross-sectional area decreases. This last feature is essential when handling a material having the peculiar resistance to deformation properties that amalgam has. A material as viscous as amalgam resists change of direction in a fashion that makes it important to avoid sharp discontinuities in the path of the amalgam. More particularly, because amalgam in general resists all changes or deformations, it becomes essential to avoid not only sharp discontinuities, but also sharp changes in the rate at which the amalgam is being squeezed and condensed.

Thus it would be possible for the conveyor 18 and associated housing 11 to have a longitudinal profile which provides a varying rate of decrease in cross-sectional area through which the amalgam passes. It would even be possible for there to be no decrease in cross-sectional area over portions of the conveyor travel. However, there must be an avoidance of any sharp changes in the magnitude of the rate at which this effective cross-sectional area (through which the amalgam passes) decreases.

There are devices which have been proposed for the conveying and injection of cement into tooth cavities and particularly into root canals. Two such devices are illustrated in German Patents 483,465 dated March 30, 1927 and 484,480 dated October 17, 1929, both issued to Mr. Eugen Weigle. Both of the devices illustrated in the Weigle patents exhibit sharp breaks in the rate at which the cross-sectional area of the conveyor decreases. Thus whatever the value may be of the Weigle devices in conveying cement to a tooth, such devices would simply jam up if one attempted to feed amalgam through them.

It is further important that the conveyor 18 be designed in such a fashion that there is a continuous positive feed of amalgam throughout the length of the conveyor. If any significant portion of the threads 18T were omitted from the conveyor 18, the amalgam would tend to solidify (that is "set") in the area where the threads 18T were missing and thus cause the instrument to jam. It is important for the proper operation of any device embodying this invention that there be a continuous positive feed or drive of amalgam through the conveyor from reservoir to exit tip.

A rod 22 is connected to the screw conveyor 18 and extends out the back of the tool 10 to be coupled to a power source which rotates the rod 22, screw conveyor 18 and spring 20 assembly to provide an amalgam conveyor. Because the pressure of the amalgam on the screws of the screw conveyor 18 will tend to force the screw conveyor 18 back, an anchor portion 24 is attached to the rear of the screw conveyor 18 to permit the screw conveyor 18 to rotate but to prevent the screw conveyor 18 from moving in a longitudinal direction. When the screw 26 is screwed into place, its end extends into an annular groove 28 cut into the anchor 24. The end of the screw 26 is not screwed down tight enough to bind on the groove 28 but simply extends into the groove 28 to prevent longitudinal movement of the screw conveyor 18. Thus the screw conveyor 18 is free to rotate while being held against longitudinal movement. A consideration of FIG. 3 will further clarify the relationship between the screw 16 and anchor 24.

It is clear from an observation of FIG. 2 and an understanding of its operation that the screw conveyor 18 will carry amalgam 30 forward from the reservoir 12. What may not be as obvious from observation is that this screw conveyor 18 will also serve to condense the amalgam (that is, squeeze out the mercury) as the amalgam is carried along. In order to provide this condensing operation, it is essential that the screw conveyor 18 be tapered inwardly towards its forward end. What happens is that there is a build-up of pressure on the amalgam that serves to condense the amalgam in much the same sense as does the normal dental operation of tamping.

The appropriate build-up of pressure occurs because the pitch of the threads 18T on the tapered screw conveyor 18 is substantially constant and the rotary speed at which the conveyor 18 is operated also remains substantially constant throughout the filling operation. Hence, as the amalgam is moved from the larger diameter end of the threaded conveyor 18 along the helical groove between the thread crests, the decreasing diameter of this helical groove as it approaches the spring 20 causes progressive compression and resulting condensation of the amalgam. Thus, by the time the amalgam reaches the flexible spring 20 it is substantially condensed. This condensing operation is one of the major advantages of this invention because it means that an operation which may take as long as fifteen (15) minutes is reduced to fifteen (15) seconds.

The fact that the dental amalgam will be condensed if it is continuously fed under progressive pressure as the amalgam proceeds toward the cavity is of major importance and has not hitherto been recognized.

As may be seen from FIGS. 2 and 4, the reservoir 12, within which amalgam 30 is contained, has a plunger 14 with a longitudinal groove 32 riding on a longitudinal ridge 34 within the reservoir 12. Thus the plunger 14 is free to move up and down within the reservoir 12 but is not free to rotate so that it retains its rotational orientation and will not contact or damage the threads 18T on the screw conveyor 18.

The curved tube 16 has a small outwardly extending flange 35 on its back end which sits flush against the front end of the housing 11 and is held against the front end of the housing 11 by a coupling nut 38. The spring 20 extends to the forward end of the curved tube 16 so as to assure that amalgam 30 will be conveyed out of the tool 10, and will not set within the tool 10. As may be seen in FIG. 2, the amalgam is deposited in a tooth 36 cavity at which point pressure may be applied by the tool 10 to finish condensing the amalgam and so form the filling 38. The spring 20 has a diameter such that it touches the inner wall of the tube 16, thereby making sure that amalgam does not set thereon.

Two small apertures 17 are located at the forward end of the walls of the curved tube 16. These small apertures serve a two-fold purpose. First, they serve as overflow valves to prevent jamming in case the tube 16 shoud become too packed with amalgam. Secondly, they serve as escape valves for the mercury which is being condensed out of the amalgam.

Within recent years, a school of thought has grown in dentistry which advocates and practices the use of an amalgam somewhat drier than had hitherto been employed. The amalgam classically applied to a cavity had a mercury content of 54% or 55%. The amalgam was then condensed by the dentist in his tamping action to produce a filling having about 50% mercury (there being a small amount of sludge on the top, after tamping, which is carried off by the dentist). It has been found preferable in the employment of the amalgam conveyor 10 of this invention to put an amalgam into the reservoir 12 that has approximately a 51% or 52% mercury content. The conveyor then serves to squeeze out between two and three percentage points of mercury resulting in a filling having between 48% and 49% mercury at the bottom and about 50% mercury at the top. It shall be understood herein that the phrase "condensed amalgam" refers to amalgam which has had the small percentage of mercury squeezed out that makes it suitable for use as a filling.

The mercury that is squeezed out during the condensing operation is squeezed toward the rear of the housing so that it becomes mixed in with the rest of the amalgam. For this reason, it is always desirable, if not necessary, to place a greater quantity of amalgam in the reservoir than is needed for the filling since the last portion of amalgam ejected will be excessively mushy.

In spite of the fact that a drier amalgam mix is initially employed, the speed with which the filling of a cavity can be undertaken by use of the device of this invention makes it possible for a dentist to complete multiple fillings at a single time from a single loading of the reservoir.

*The helical spring*

The spring 20 is detachable from the screw conveyor 18 so that the spring 20 can be replaced whenever it breaks. The spring 20 is connected to the screw conveyor 18 so that it will be forced to rotate as the screw conveyor 18 rotates and so that the spring 20 will form part of a screw conveyor system for conveying the amalgam. Because the tube 16 is curved and thus the spring 20 is bent, the rotation of the spring 20 establishes stresses and strains in the spring 20 that give the spring 20 a limited life. In two embodiments (one employing a stainless steel spring 20 having a 0.062 inch diameter and the other employing a stainless steel spring 20 having a 0.082 inch diameter), the spring had to be replaced approximately once every day or two or once every thirty average fillings. Thus it is not only important that the spring 20 be detachable from the screw conveyor 18 but also that entire tool 10 be easy to disassemble so that the spring 20 can be readily replaced.

As may best be seen in FIGS. 5 and 6, the helical spring 20 has a slightly larger diameter over its rearward few turns in order to provide as even and smooth a transition from the threads 18T of the screw conveyor 18 to the turns of the spring 20. A smooth and even transition is desired in order to avoid those kinds of discontinuities which might result in the amalgam setting. As may be seen in FIG. 7, the rearward end 42 of the spring 20 is bent to pass into a small hole 40 in the forward tip of the screw conveyor 18. When assembled, the spring 20 is so constrained by the walls of the housing that the spring end 42 will be held in the hole 40. Yet on disassembling the tool, it becomes very simple to remove and replace the spring 20.

Proper operation of the tool 10 of this invention requires some attention to the design of the spring 20. As has been pointed out, it is preferable that the rearward few turns of the spring 20 gradually taper outward so as to provide as continuous a path as possible for the amalgam. Furthermore, as has been pointed out, the spring 20 is employed in part to provide a hollow core within which the amalgam can be carried without setting. A major purpose of the decreasing taper on the conveyor 18 is to provide increasing pressure on the amalgam as it is conveyed forward to the discharge end so that the amalgam will be condensed. However, by the time the amalgam is ready to be passed to the spring 20, it has become relatively dry and it is important that it not be further condensed so as to avoid binding. Indeed, in order to convey the amalgam from the tip of the conveyor 18 forward, it is desirable, if not necessary, that the effective cross-sectional area through which it passes be increased somewhat as the condensed amalgam leaves the tip of the conveyor 18 to assure that the amalgam will not bind before it is applied to the tooth cavity. In the embodiment shown, the effective cross-sectional area across the spring 20 is greater than the effective cross-sectional area of the groove through which the amalgam passes at the end of the conveyor 18.

To provide an adequate size hollow core, it has been found that helical spring 20 diameters below 0.062 inch tend to cause a problem in adequately conveying the amalgam without creating such back-up pressure as to run the risk of setting. However, if the spring diameter is too large, the amalgam in the hollow core will not all be carried forward and will, as a consequence, set within the dental tool 10. Spring 20 diameters up to approximately 0.156 inch have been found useable and useful. Spring 20 diameters larger than 0.156 inch create the problem of having amalgam lodge at the core of the spring 20 and thus solidify there.

For reasons similar to those that dictate certain minimum and maximum spring diameters, there are certain minimum and maximum wire diameter considerations which have to be taken into account. Too small a wire diameter will mean that the spring 20 will be too weak and will compress under the pressures involved. Diameters down to 0.012 inch have been found useful and it is preferred down to 0.012 inch be the minimum wire diameter employed in the spring 20. Wire diameters that are too large have the problem of providing a spring 20 which is too rigid as well as taking up too much space so that there isn't adequate area for the amalgam to pass through. The rigidity of the spring means that it will break too frequently. It is preferred to use a wire diameter no greater than 0.025 inch for these reasons. A stainless steel spring 20 having a wire diameter of 0.015 inch has been found optimum; having the maximum life consistent with the rigidity necessary to push the amalgam along. Wire diameter is an important factor in spring 20 life.

The pitch of the spring 22 is another factor that must be taken into consideration and it is preferred to use a spring 20 design that has a pitch somewhere between five turns to the inch and 32 turns to the inch. The amalgam is not properly carried along if the spring pitch is outside of those limits. If fewer than five turns to the inch is employed, there is insufficient longitudinal crust to the amalgam, and if more than 32 turns to the inch is employed, most of the amalgam will be in the core of the spring and very little will be between the thread so that an inadequate amount will be carried.

Accordingly, of all the elements of the dental tool 10 of this invention, the spring 20 is the most critical and the one which has to be designed with the greatest care in order to get optimum performance.

For ease of use, it is very important that the front end of the amalgam conveyor 10 be curved and for that reason the curved tube 16 is provided. This permits the dentist to hold the amalgam conveyor conveniently while applying the outlet end of the conveyor appropriately to the tooth. It shall be understood that it is within the present invention to accomplish this change in direction of flow of amalgam for the convenience of the user by means of a tube 16 with a sharp angular break rather than a curved form. It would thus be possible to employ small gears in order to connect the main screw conveyor 18 to a helical spring at an angle to the main screw conveyor 18 so as to provide a continuous screw conveying of amalgam through the dental tool. Such is not shown herein because this would be a more complex, more expensive and generally less desirable embodiment for the invention even though it would permit avoiding having to curve the spring 20 and thus could result in an amalgam conveyor tool where no part would have to be replaced on a regular basis.

The above description of a tube 16 having a sharp angular break rather than a curved form should not be understood to detract from the importance of the design feature, mentioned earlier, that sharp discontinuities and sharp changes in the rate at which the effective cross-sectional area decreases must be avoided. A discontinuity in the tube 16, at a point where the amalgam is no longer being condensed, may be tolerated only if the design is such that the cross-sectional area is kept substantially contant throughout the length of the tube 16. A sharp change in cross-sectional area even in the tube 16 portion of the amalgam conveyor, is likely to cause setting of the amalgam and jamming of the conveyor.

The term amalgam is employed throughout the specification and claims to refer to the dental filling material employed because the silver-mercury mixture is the dominant filling material used in the art. However, it shall be understood that the term amalgam herein shall be considered to cover any dental filling material having a consistency such that it could be fed by the device of this invention.

This and other variations in the embodiment disclosed would be apparent to those in this art and the following claims shall be understood to encompass all such variations and modifications.

What is claimed is:

1. An amalgam condenser and carrier comprising in combination:

a housing having an inlet opening adjacent one end and a discharge opening at the opposite end of said housing;

at least the interior of said housing decreasing progressively in diameter from adjacent said inlet opening to said discharge opening, a screw conveyor supported for rotation within the interior of said housing and complementary in shape thereto, said conveyor having threads thereon of uniform pitch and depth, whereby the groove defined by said threads comprises a spiral passage from said amalgam, said passage being of uniform depth and progressively decreasing uniformly in diameter to said discharge opening of said housing and upon rotation of said screw in a feeding direction simultaneously feeds and condenses said amalgam without sharp changes in magnitude and direction to insure uninterrupted feeding movement of said amalgam through said housing from said inlet to said discharge opening, and means to rotate said screw in said feeding direction.

2. The amalgam condenser and carrier according to claim 1 in which said screw conveyor is fitted relative to the inner wall of said housing so as to provide a wiping action between the tips of the threads of said screw conveyor and the inner wall of said housing.

3. The amalgam condenser and carrier according to claim 1 including positioning means operable relative to said screw conveyor to prevent any appreciable axial movement thereof relative to said housing.

4. The amalgam condenser and carrier according to claim 1 further including an amalgam reservoir communicating with said inlet opening.

5. The amalgam condenser and carrier according to claim 4 further including a plunger in said reservoir operable to be pressed toward said inlet opening of said housing to insure the delivery of amalgam from said reservoir to said spiral passage between said threads on said screw conveyor.

6. The amalgam condenser and carrier according to claim 1 further including a curved tubular discharge tube connected to the discharge end of said housing and further including a flexible helical spring rotatably driven within said curved tubular discharge tube by said screw conveyor to insure discharge of condensed amalgam from said curved tubular tube.

7. The amalgam condenser and carrier according to claim 6 in which the outer diameter of said spring is substantially equal to the inner diameter of said curved tubular discharge tube, whereby said spring wipingly engages the inner walls of said curved tubular tube.

8. The amalgam condenser and carrier according to claim 7 in which the rearward end of said spring terminates in a hook, said hook being a segment of the diameter of said spring and disposed in a hole in the smaller end of said screw conveyor to connect the spring thereto for rotation therewith.

9. The amalgam condenser and carrier according to claim 8 in which the diameter of the wire constituting said helical spring is between 0.012 inch and 0.025 inch.

10. The amalgam condenser and carrier according to claim 8 in which the diameter of said forward portion of said spring is substantially between 0.062 inch and 0.156 inch.

References Cited

UNITED STATES PATENTS

| | | | |
|---|---|---|---|
| 1,771,182 | 7/1930 | Lentulo | 32—60 |
| 2,212,116 | 8/1940 | Eberenz | 32—40 |
| 2,606,645 | 8/1952 | Heine | 222—413 |
| 2,908,425 | 10/1959 | Denson | 222—413 |

FOREIGN PATENTS

| | | |
|---|---|---|
| 483,465 | 3/1927 | Germany. |
| 484,480 | 10/1928 | Germany. |

OTHER REFERENCES

German printed application #1112810, 8/1961, Lödige, 32–27, 4 pages spec., 2 pages drawing.

LOUIS G. MANCENE, *Primary Examiner.*

R. PESHOCK, *Assistant Examiner.*